(12) United States Patent
Schumnig

(10) Patent No.: US 10,041,376 B2
(45) Date of Patent: Aug. 7, 2018

(54) EXHAUST-GAS TURBOCHARGER

(71) Applicant: BorgWarner Inc., Auburn Hills, MI (US)

(72) Inventor: Oliver Schumnig, Gundersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 149 days.

(21) Appl. No.: 14/781,384

(22) PCT Filed: Apr. 3, 2014

(86) PCT No.: PCT/US2014/032771
§ 371 (c)(1),
(2) Date: Sep. 30, 2015

(87) PCT Pub. No.: WO2014/168803
PCT Pub. Date: Oct. 16, 2014

(65) Prior Publication Data
US 2016/0032768 A1    Feb. 4, 2016

(30) Foreign Application Priority Data
Apr. 12, 2013   (DE) .......................... 10 2013 006 349

(51) Int. Cl.
| | | |
|---|---|---|
| F01D 25/14 | (2006.01) | |
| F01D 25/16 | (2006.01) | |
| F01D 25/24 | (2006.01) | |
| F02C 6/12  | (2006.01) | |
| F01D 5/02  | (2006.01) | |

(Continued)

(52) U.S. Cl.
CPC ............. *F01D 25/145* (2013.01); *F01D 5/02* (2013.01); *F01D 25/16* (2013.01); *F01D 25/162* (2013.01); *F01D 25/24* (2013.01); *F02B 33/40* (2013.01); *F02B 37/00* (2013.01); *F02C 6/12* (2013.01);
(Continued)

(58) Field of Classification Search
CPC ........ F02B 37/00; F02B 33/40; F01D 25/145; F02C 6/12; F05D 2220/40
See application file for complete search history.

(56) References Cited

U.S. PATENT DOCUMENTS

| | | | |
|---|---|---|---|
| 5,145,334 A * | 9/1992 | Gutknecht | ............ F01D 25/164 417/407 |
| 2005/0053463 A1 | 3/2005 | Kopp et al. | |

(Continued)

FOREIGN PATENT DOCUMENTS

| | | |
|---|---|---|
| EP | 2055911 A1 | 5/2009 |
| JP | 07189723 A | 7/1995 |
| JP | 2004353660 A | 12/2004 |

OTHER PUBLICATIONS

Written Opinion and International Search Report in International Application No. PCT/US2014/032771, dated Aug. 13, 2014.

*Primary Examiner* — Christopher Verdier
*Assistant Examiner* — Maxime Adjagbe
(74) *Attorney, Agent, or Firm* — Eric L. Doyle; Stephen A. Pendorf; Patent Central LLC

(57) ABSTRACT

An exhaust-gas turbocharger (1) having a compressor housing (2) in which a compressor wheel (2') is arranged; a bearing housing (3); and a turbine housing (4) in which a turbine wheel (4') is arranged. The axial abutment surfaces (5, 6) are provided between the bearing housing (3) and the turbine housing (4). The axial abutment surfaces (5, 6) have at least one notch (9).

7 Claims, 2 Drawing Sheets

(51) Int. Cl.
  *F02B 33/40*  (2006.01)
  *F02B 37/00*  (2006.01)
  *F02B 39/16*  (2006.01)

(52) U.S. Cl.
  CPC .......... *F02B 39/16* (2013.01); *F05D 2220/40* (2013.01); *F05D 2260/231* (2013.01)

(56) References Cited

U.S. PATENT DOCUMENTS

| | | | |
|---|---|---|---|
| 2005/0091984 A1* | 5/2005 | Czachor | F01D 25/14 60/772 |
| 2007/0089414 A1 | 4/2007 | Yokoyama et al. | |
| 2009/0246005 A1* | 10/2009 | Eble | F01D 17/165 415/170.1 |
| 2010/0043431 A1 | 2/2010 | Thayer et al. | |
| 2011/0142604 A1* | 6/2011 | Schumnig | F01D 25/24 415/170.1 |

\* cited by examiner

EXHAUST-GAS TURBOCHARGER

BACKGROUND OF THE INVENTION

Field of the Invention

The invention relates to an exhaust gas turbocharger designed to reduce the transmission of heat from the turbine housing to the bearing housing.

DESCRIPTION OF THE RELATED ART

The bearing housing and the turbine housing of an exhaust-gas turbocharger of said type have a relatively large contact surface owing to the provision of a force-transmitting axial surface and a radial centering surface.

Owing to the high exhaust-gas temperatures that are encountered in modern Otto-cycle and diesel engines, the bearing arrangement of the exhaust-gas turbocharger in the bearing housing is subject to high thermal loading.

This can result in oil coking in the bearing housing, an exceedance of the admissible component limit temperatures, and also an impairment of bearing stability.

BRIEF SUMMARY OF THE INVENTION

It is therefore an object of the present invention to provide an exhaust-gas turbocharger of the type indicated in the preamble of claim 1 which makes it possible to at least alleviate the technical problems explained above.

This object is achieved by the features of claim 1.

Through the provision of at least one notch in at least one of the axial abutment surfaces, it is possible for the contact surface to be decreased in size, and thus the introduction of heat into the bearing housing to be reduced.

It is preferably possible for a multiplicity of such notches to be provided.

Here, the notches may be provided in a turbine-housing-side abutment surface and/or in a bearing-side abutment surface. To reduce a transmission of heat from the turbine housing to the bearing housing, a contact surface of a radial centering surface pairing can be reduced, for example through the formation of notches or the division of the centering surface pairing into a multiplicity of centering points of small area.

It is also possible for at least one thermal insulator to be arranged between the axial abutment surfaces, which thermal insulator performs the transmission of force and the thermal insulation and thus prevents any direct contact between the axial abutment surfaces.

It is possible here for the thermal insulator to be in the form of a closed ring or else in the form of a multiplicity of segments with clearly defined breaking edges.

It is preferable here for the thermal insulator to be arranged in a groove in the bearing housing and/or in the turbine housing such that an ingress of fragments into the exhaust-gas turbocharger in the event of the thermal insulator becoming damaged can be prevented.

Finally, it is possible for the one or more thermal insulators to be of such a size as to extend behind the turbine wheel. It is alternatively possible for an additional thermal insulator to be arranged in the region behind the turbine wheel.

Further details, features and advantages of the invention become apparent from the following description of exemplary embodiments with reference to the drawing, in which:

DETAILED DESCRIPTION OF THE INVENTION

Figure 1:
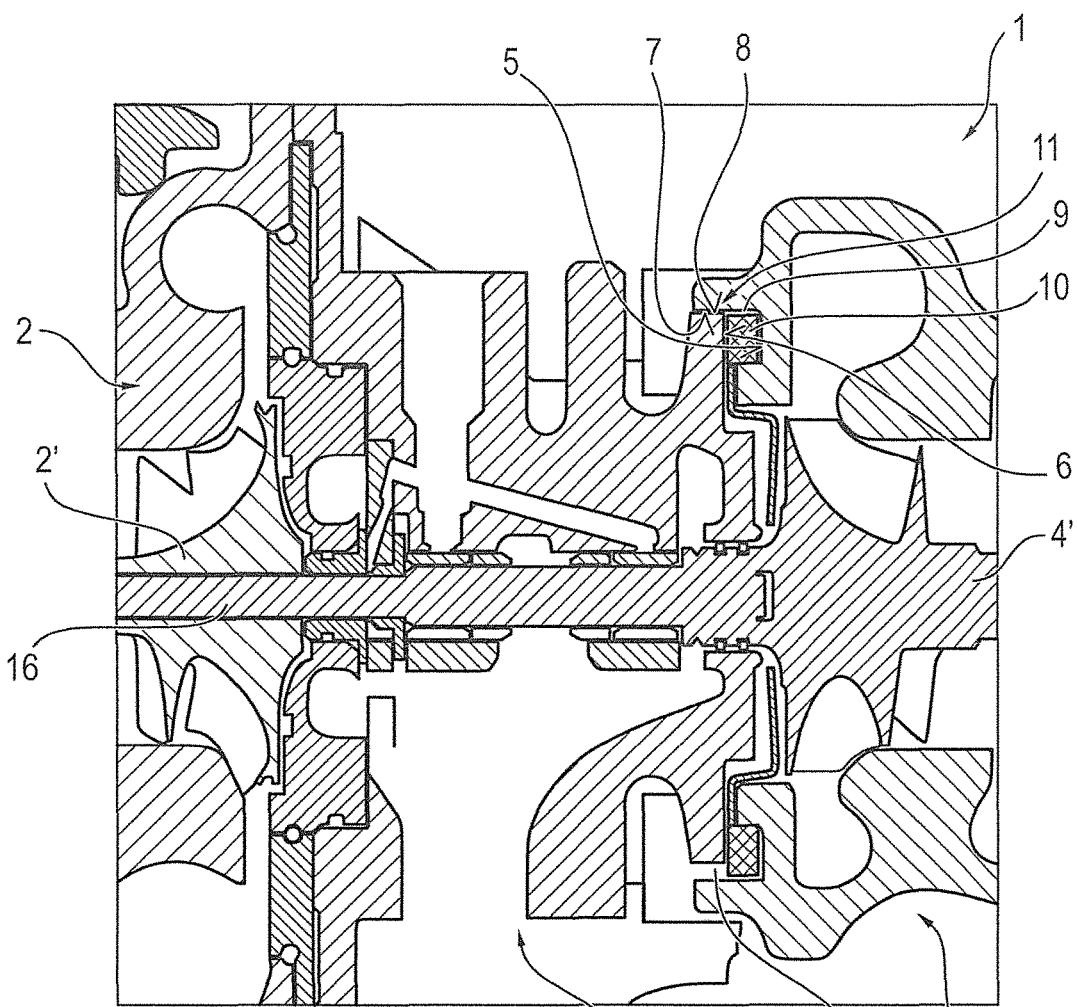
FIG. 1 shows a schematically slightly simplified sectional illustration through an exhaust-gas turbocharger according to the invention.

The exhaust-gas turbocharger 1 illustrated in FIG. 1 has a compressor housing 2 with a compressor wheel 2' arranged therein, a bearing housing 3, and a turbine housing 4, said housings being mounted on one another. The bearing housing 3 serves for mounting a shaft 12 which, on one end, bears the compressor wheel 2' and, on its other end, bears a turbine wheel 4' which is arranged in the turbine housing 4.

The turbine housing 4 has a turbine-housing-side axial abutment surface 5. The bearing housing 3 has a bearing-housing-side axial abutment surface 6.

Furthermore, there is a centering surface pairing formed by a turbine-housing-side centering surface 7 and a bearing-housing-side centering surface 8.

It can be seen from FIG. 1 that the axial abutment surfaces 5, 6 have a notch 9 in which, in the particularly preferred embodiment illustrated in FIG. 1, there is arranged a thermal insulator 10 which may be constructed for example from ceramic material. As explained in the introduction, it would basically also be conceivable to provide only the notch 9 without the thermal insulator 10, which in itself would result in a reduction of the introduction of heat into the bearing housing 3 because a heat-transmitting contact surface between the axial abutment surfaces 5, 6 can be reduced in size simply by means of a notch 9 of said type.

The embodiment illustrated in FIG. 1 is however preferable owing to the provision of a thermal insulator 10, because, by means of said thermal insulator 10, contact between the abutment surfaces 5 and 6 can be prevented, as emerges from the illustration of FIG. 1. In this case, the transmission of force between the bearing housing 3 and the turbine housing 4 takes place via the thermal insulator 10, as illustrated in FIG. 2.

Figure 2:
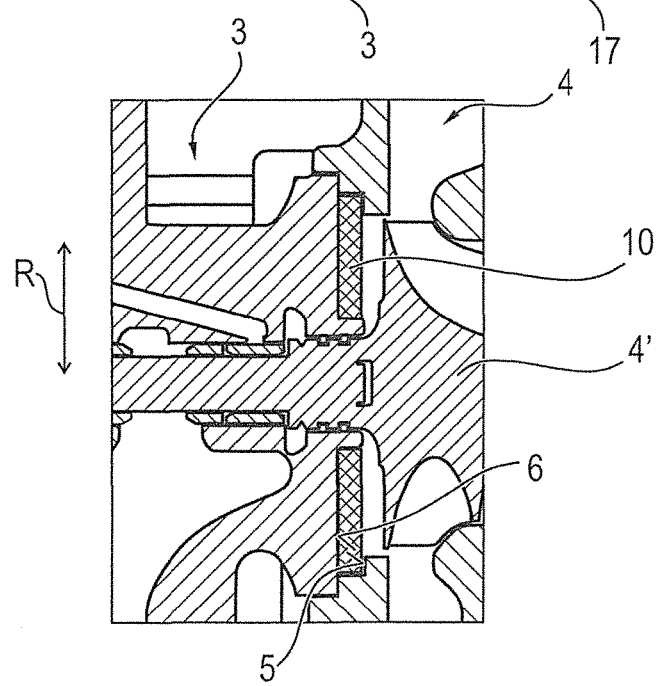
FIG. 2 shows an illustration, corresponding to FIG. 1, of a sub-region of the bearing housing and of the turbine housing according to a second embodiment of the exhaust-gas turbocharger according to the invention.

Here, FIG. 2 shows that it is possible for the thermal insulator 10 to be of such a size that, as viewed in the radial direction R of the exhaust-gas turbocharger 1, it extends behind the turbine wheel 4', which permits a further reduction of the transfer of heat into the bearing housing 3.

The radial centering surface pairing 7, 8 may be in the form of a centering lobe arrangement, wherein in FIG. 1, owing to the selected illustration, one centering lobe 11 is visible.

Figure 3:
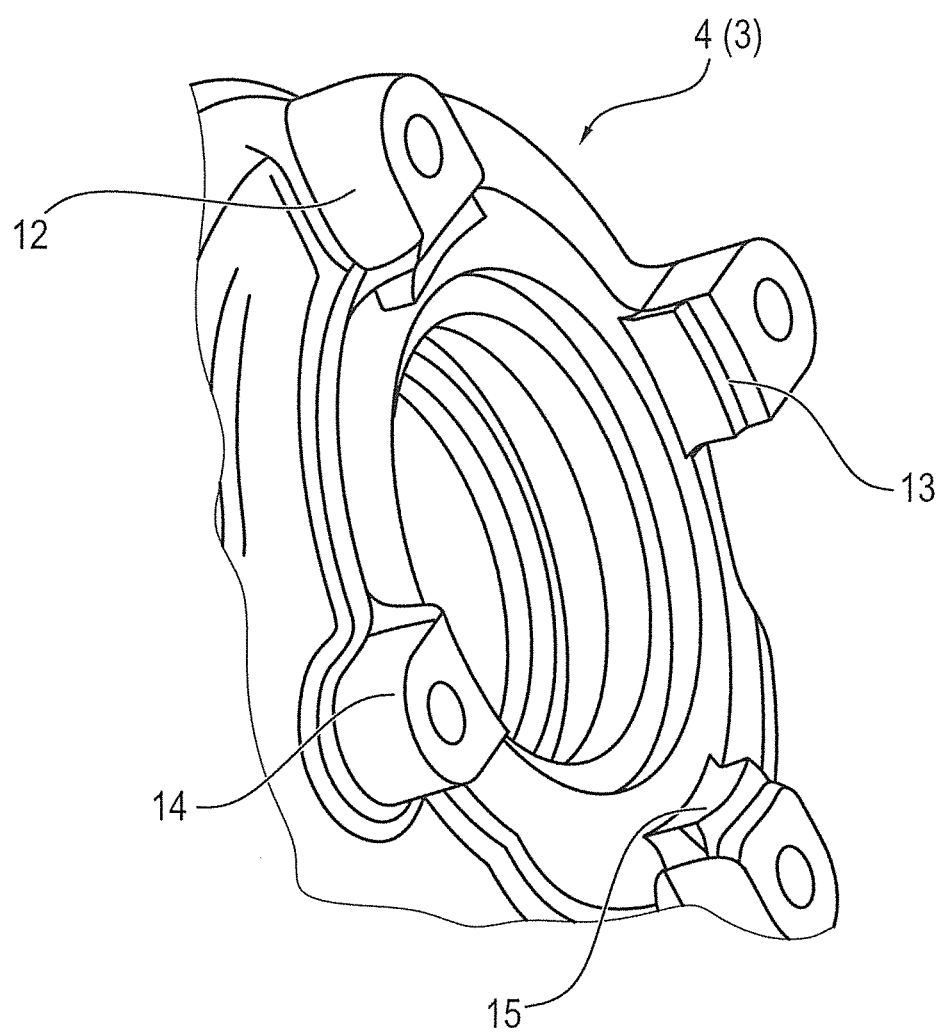
FIG. 3 shows a slightly simplified perspective detail illustration of a centering lobe arrangement.

It would however be preferable, as shown in FIG. 3, for four such centering lobes 12, 13, 14 and 15, for example, to be provided, which centering lobes may be arranged in each case separately from one another on the turbine housing 4 or on the bearing housing 3. The clearance generated by said arrangement is denoted in FIG. 1 by the reference sign 17.

In addition to the above written disclosure of the invention, reference is hereby explicitly made to the illustrative representation in FIGS. 1 to 3 to supplement the disclosure.

LIST OF REFERENCE SIGNS

1 Exhaust-gas turbocharger
2 Compressor
2' Compressor wheel
3 Bearing housing
4 Turbine housing
4' Turbine wheel
5 Turbine-housing-side abutment surface
6 Bearing-housing-side abutment surface
7 Turbine-housing-side radial centering surface
8 Bearing-housing-side centering surface
9 Notch (groove)
10 Thermal insulator
11-15 Centering lobes
16 Shaft
17 Clearance
R Radial direction

The invention claimed is:

1. An exhaust-gas turbocharger (1) having:
   a compressor housing (2) in which a compressor wheel (2') is arranged;
   a bearing housing (3), the bearing housing including a turbine housing facing axial abutment surface (6);
   a turbine housing (4) in which a turbine wheel (4') is arranged, the turbine housing (4) including a bearing housing facing axial abutment surface (5); and
   means for mounting the turbine housing (4) axially tightly to the bearing housing (3),
   wherein at least one of the turbine housing facing axial abutment surface (6) of the bearing housing (3) and the bearing housing facing axial abutment surface (5) turbine housing of the (4) is provided with a notch,
   wherein the turbine housing facing axial abutment surface (6) of the bearing housing (3) is spaced apart from bearing housing facing axial abutment surface (5) of the turbine housing (4) by at least one thermal insulator (10) which is arranged in the notch such that the thermal insulator (10) prevents direct contact between the axial abutment surfaces (5, 6) and such that any transmission of axial force between the bearing housing (3) and the turbine housing (4) takes place via the thermal insulator (10).

2. The exhaust-gas turbocharger as claimed in claim 1, wherein the thermal insulator (10) is ceramic.

3. The exhaust-gas turbocharger as claimed in claim 1, wherein the thermal insulator (10) is constructed from a multiplicity of separate segments.

4. The exhaust-gas turbocharger as claimed in claim 1, wherein the thermal insulator (10) extends radially inward behind the turbine wheel (4').

5. The exhaust-gas turbocharger as claimed in claim 1, wherein a further thermal insulator is provided which is arranged behind the turbine wheel (4').

6. The exhaust-gas turbocharger as claimed in claim 1, having a radial centering surface pairing (7, 8) formed by a multiplicity of centering lobes (11-15).

7. The exhaust-gas turbocharger as claimed in claim 6, wherein a clearance (17) is arranged between the centering lobes (11-15).

* * * * *